UNITED STATES PATENT OFFICE.

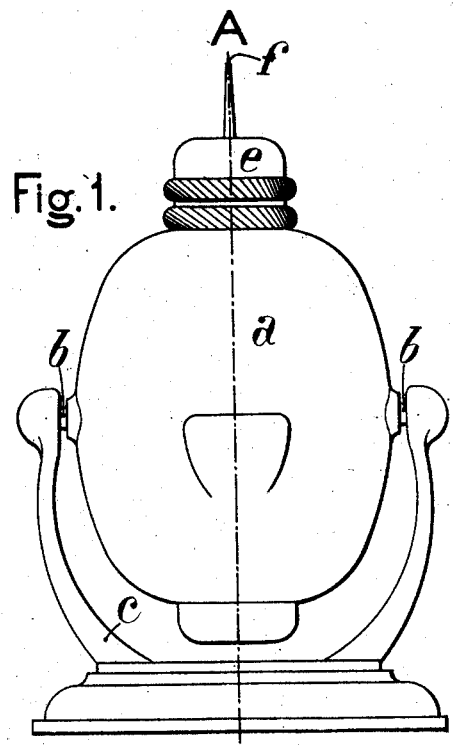
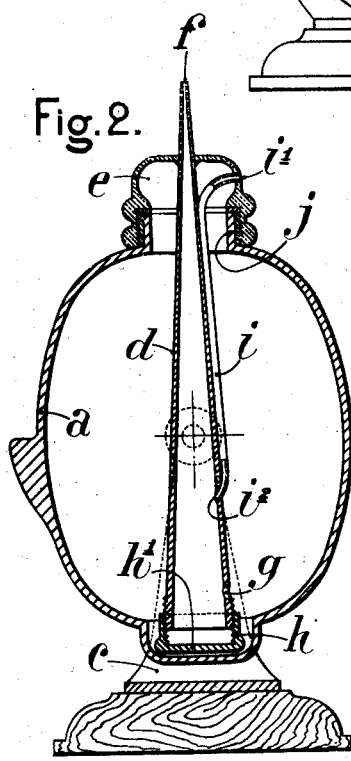
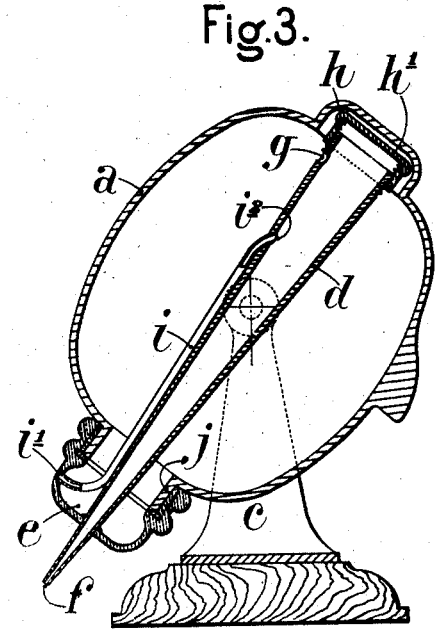

STANISLAS EFFANTIN, OF ST. CLOUD, FRANCE.

APPARATUS FOR DISTRIBUTING LIQUIDS IN MEASURED QUANTITIES.

971,259.  Specification of Letters Patent.  Patented Sept. 27, 1910.

Application filed November 20, 1909. Serial No. 529,093.

*To all whom it may concern:*

Be it known that I, STANISLAS EFFANTIN, a citizen of the French Republic, and resident of St. Cloud, France, have invented certain new and useful Improvements in Apparatus for Distributing Liquids in Measured Quantities, of which the following is a specification.

This invention relates to an apparatus for distributing liquids in measured quantities, the quantity of liquid to be distributed being regulated according to requirement. The liquid is poured out by turning the apparatus upside down.

This distributer is particularly adapted for the distribution of liquid soap or antiseptic substances, but it can be used for any other liquid.

The apparatus is particularly characterized by the fact that the quantity of liquid distributed is always exactly measured, the distributing apparatus having further no closing device which has to be removed before the liquid can be poured out.

In the accompanying drawings the improved apparatus is shown in its preferred form of execution.

Figure 1 represents the distributer in a front view. Fig. 2 is a vertical section on line A—A of Fig. 1 and Fig. 3 is a similar section showing the distributer turned over for pouring out the liquid.

The improved apparatus comprises a vessel $a$ of convenient shape of glass or any other suitable material which is mounted with its two pivots $b$, $b$ in a support $c$ of convenient shape, so that it can be turned upside down as shown in Fig. 3.

The measuring and distributing device essentially consists of a conical tube $d$ which is fixed with its upper small end in the stopper $e$ of the vessel $a$ and which reaches down nearly to the bottom of said vessel $a$. The point $f$ of the conical tube, which is open, projects from the stopper $e$. The conical tube $d$ has at a short distance above its bottom end a small orifice $g$, its bottom end being closed by a removable lid $h$ screwed upon the bottom end of the tube $d$ so that it can be more or less screwed upon said tube to regulate the quantity of liquid to be distributed, according to the distance between the bottom part $h^1$ of the cover $h$ and the orifice $g$.

The distributing device further comprises a small tube $i$ which opens at its upper end by means of an orifice $i^1$ in the stopper $e$, into the outer air and at its other end $i^2$ into the conical tube $d$ near the bottom end of the same but at a certain distance above the orifice $g$. The orifice $g$ and the small air tube $i$ are arranged in the plane of oscillation which passes through the axis of the distributing tube $d$, that is to say in the plane of the section shown in Figs. 2 and 3 so that they are situated on the upper side of said distributing tube $d$ when the apparatus is turned over.

The apparatus operates as follows:—To fill the vessel $a$ the stopper $e$ which is screwed upon the threaded flange $j$ of the vessel is removed. The stopper $e$ is tightly screwed upon flange $j$ after the vessel $a$ has been filled so that said vessel is hermetically closed. The conical tube $d$ being in communication, on the one hand with the vessel $a$ through the orifice $g$ and, on the other hand with the atmosphere through the air tube $i$ the liquid flows into the conical tube $d$ till it closes the orifice $g$; if the vessel $a$ is turned over (Fig. 3), the liquid contained in the conical distributing tube $d$ flows along the wall of said tube out through the opening $f$, the atmospheric pressure acting freely upon the liquid through the air tube $i$. As the atmospheric pressure cannot act upon the liquid contained in vessel $a$ when the orifice $g$ is closed the inflow of the liquid into the conical tube $d$ ceases as soon as the liquid in tube $d$ has reached the upper edge of said orifice $g$ so that said tube $d$ is always filled with a uniform measured quantity of liquid which depends on the distance between the bottom $h^1$ of tube $d$ and the upper edge of said orifice $g$. After the apparatus has been turned back to the vertical position, the determined quantity of liquid flows again into the distributing tube $d$. The conical distributing tube $d$ will fill only up to the orifice $g$ if the vessel $a$ is hermetically closed. As this condition is not fulfilled at the moment when the conical tube is inserted into the vessel $a$ said distributing tube will tend to fill up to the level of the liquid in the vessel $a$ so that at the first distribution of liquid a much larger quantity of liquid would be distributed. To prevent this inconvenience the orifices $f$ and $i^1$ are to be closed during the filling of the vessel $a$ and the reinsertion of the conical distributing tube $d$, which can be easily done by means of stoppers, screw caps or the like.

The bottom plate $h$ of the conical distributing tube $d$ being adjustably mounted upon the end of said tube, the distance between the bottom $h^1$ and the orifice $g$ can be regulated according to the quantity of liquid to be distributed. It is evident that the form and dimensions of the different parts of the distributer can be modified according to requirement.

I claim:—

An apparatus for distributing liquid in measured quantities comprising in combination a vessel of convenient shape and material, a support in which said vessel is pivoted so that it can be turned upside down, a screw stopper for closing the upper end of said vessel, the conical distributing tube fixed with its small end in said stopper so that its open pointed end projects from said stopper, the large bottom end reaching down nearly to the bottom of said vessel, said tube having at some distance above the bottom a small inlet hole, an adjustable cap for closing the bottom end of said conical distributing tube and an air tube fixed with one open end in said conical distributing tube at some distance above the inlet of the same and with the other end in the stopper of the vessel so that it communicates with the atmosphere, substantially as described and shown and for the purpose set forth.

In witness whereof I have hereunto set my hand in the presence of two witnesses.

STANISLAS EFFANTIN.

Witnesses:
CHARLES PETITJEAN,
H. C. COXE.